Oct. 5, 1965   W. B. SEIDEL   3,209,494
METHOD OF AND APPARATUS FOR GRINDING ANNULAR WORKPIECES
Filed Oct. 15, 1962   7 Sheets-Sheet 1

Fig. 1

INVENTOR.
WILLIAM B. SEIDEL
BY
Howard Keiser
& John F. Verhoeven
ATTORNEYS

Oct. 5, 1965 W. B. SEIDEL 3,209,494
METHOD OF AND APPARATUS FOR GRINDING ANNULAR WORKPIECES
Filed Oct. 15, 1962 7 Sheets-Sheet 5

Oct. 5, 1965    W. B. SEIDEL    3,209,494
METHOD OF AND APPARATUS FOR GRINDING ANNULAR WORKPIECES
Filed Oct. 15, 1962    7 Sheets-Sheet 6

3,209,494
METHOD OF AND APPARATUS FOR GRINDING ANNULAR WORKPIECES
William B. Seidel, Cincinnati, Ohio, assignor to The Cincinnati Milling Machine Co., Cincinnati, Ohio, a corporation of Ohio
Filed Oct. 15, 1962, Ser. No. 230,365
37 Claims. (Cl. 51—103)

The present invention relates to a method of and apparatus for grinding of annular workpieces, particularly suitable for grinding the inner or outer peripheral surface of a thin walled annular workpiece.

Annular workpieces, particularly if short, are difficult to clamp to a headstock for rotation during grinding in a manner to avoid interference with a grinding operation on a peripheral surface. Moreover, clamping the annular workpiece, particularly a thin walled workpiece, tightly enough to resist the laterally applied force, which is generated when the grinding wheel feeds into a peripheral surface, can cause distortion of the workpiece affecting the precision of the grind. Generally, the cross-sectional area of an annular workpiece is too small to permit a grip by a magnetic chuck sufficient to hold the workpiece against the lateral force applied to the workpiece by the grinding wheel as it feeds into the workpiece.

Frequently, annular workpieces are ground by centerless grinding operations where the workpieces are not clamped in the machine. In one type of centerless grinding, a control wheel, on one side of a blade which supports the workpiece, rotates the workpiece and provides a rigid support therefor as the workpiece engages a grinding wheel on the opposite side of the blade. In another type of centerless grinding (described in U.S. Patent 2,478,607), one end of a workpiece is urged (usually magnetically) against a face plate which rotates about an axis. The workpiece is positioned on the face plate, not centrally with respect to the axis of rotation thereof, but with the central axis of the workpiece displaced in eccentric relation to the axis of rotation of the face plate. The workpiece is rotated by the face plate and maintained in eccentric relation thereto by a pair of angularly spaced shoes which engage the workpiece. The workpiece, which can slide on the face plate although magnetically held thereagainst, is held in firm engagement with the shoes by virtue of the sliding engagement of the rotating face plate with the workpiece and the eccentric relation which is maintained between the face plate and the workpiece. With the workpiece held firmly by the shoes, the grinding wheel is brought into abrading contact with the workpiece. While, in some applications of this latter type of centerless grinding, one or both shoes may pivot to accommodate the diminishing size of the workpiece, the shoes pivot about fixed axes and define rigid supports which hold the workpiece in eccentric relation to the face plate and locate the workpiece relative to the grinding wheel.

In those centerless grinding operations where the workpiece supporting members (the control wheel and blade or the shoes) are angularly spaced from the grinding wheel, there is a tendency for distortion of thin walled workpieces when the grinding force is applied to the workpiece. Moreover, in conventional centerless grinding operations, the workpiece is rotated against a stationary metal support the support blade or the shoes), and this frictional engagement generates heat, tending to expand the workpiece during grinding to the deteriment of the precision of the grind.

In the present invention, which relates to the grinding of an annular workpiece, the workpiece is not clamped in the machine but, instead, is bodily shiftable within a plane during grinding. Support, control, and location of the workpiece within that plane is provided by fluid pressure forces applied around the workpiece to the peripheral surface thereof not being ground. These fluid pressure forces, which are determined by the position of the workpiece, are balanced when the workpiece is in a predetermined position. When the workpiece is displaced from that predetermined position by the grinding force acting on a peripheral surface of the workpiece, the forces become unbalanced to urge the workpiece back to its predetermined position.

In brief, in the preferred form of the invention, a magnetic face plate rotates about an axis, as in a previous types of centerless grinding. A support member has a longitudinal central axis fixed in predetermined relation to the final position of the grinding wheel and has a support surface defining, in cross-section, a circle having a center on said longitudinal axis which is coaxial with the axis of rotation of the face plate. If for example, the outer peripheral surface of an annular workpiece is to be ground, the outer surface of the support member constitutes the support surface and the workpiece is magnetically gripped on the face plate over this support surface. The diameter of the support surface is smaller than the diameter of the inner peripheral surface of the workpiece so that the workpiece is laterally shiftable on the face plate within the limits defined by the support member. The support member has a plurality of fluid passages terminating in equally angularly spaced openings in the support surface, and fluid under pressure is discharged through these openings to urge a workpiece on the face plate to a position in centered relation to the support member. When the workpiece is positioned on the face plate in centered relation to the support member, an annular gap of constant span completely around the workpiece is established between the workpiece and the support surface, and the fluid pressure forces around the workpiece, which are determined by the span of the gap at each opening, are balanced.

When a workpiece, which is initially urged into a central position relative to the axis of the support member and the axis of rotation of the face plate before the grind, is engaged by the grinding wheel, the workpiece, instead of deforming under the grinding force, is bodily shifted thereby off-center relative to the support surface. As the workpiece is bodily shifted off-center relative to the support surface, the span of the gap on one side of the workpiece (away from the grinding wheel) increases while the span on the other side of the workpiece (at the grinding wheel) decreases. Fluid is continuously discharged through the openings during grinding and the unbalance of fluid pressure forces caused by the change in gap around the workpiece creates a differential fluid pressure force urging the workpiece back to a central position relative to the support member, the magnitude of this differential pressure force increasing as the bodily displacement of the workpiece from the central position relative to the support member increases. As the grinding force on the workpiece diminishes, the differential pressure force moves the workpiece back to a central position relative to the support member and the central axis thereof to precisely locate the workpiece relative to the final position of the grinding wheel.

Displacement of the workpiece during the grind as the grinding force is applied to the workpiece increases the fluid pressure force at the grinding wheel, which acts on the surface not being ground to oppose the grinding force. At the same time the fluid pressure force on the opposite side of the workpiece decreases, minimizing the tendency to distort the workpiece during grinding. Although the lateral displacement of the workpiece during grinding is small, distortion of the workpiece upon the application of the grinding force during grinding is reduced to the extent the workpiece yields under the grinding force. The fluid support provided all around the workpiece, and the lack of distortion during grinding, contributes to the excellent roundness of workpieces ground. Since the supporting forces act on the peripheral surface of the workpiece not being ground and are distributed around the workpiece, good concentricity between the peripheral surface ground and the other peripheral surface of the workpiece is achieved. In supporting an unclamped workpiece with fluid during grinding, not only is the generation of heat by rotation of the workpiece on a metal blade or in metal shoes avoided, but the fluid serves continuously to remove heat from the operation.

It is therefore one object of the present invention to support, control, and locate an unclamped workpiece in a grinding machine with minimum distortion of the workpiece during the grind.

It is another object of the present invention to support an unclamped workpiece in a grinding machine with minimal temperature variations.

It is another object of the present invention to locate an unclamped workpiece in a grinding machine relative to the final position of the grinding wheel by the application of fluid pressure forces around the workpiece during grinding.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1:
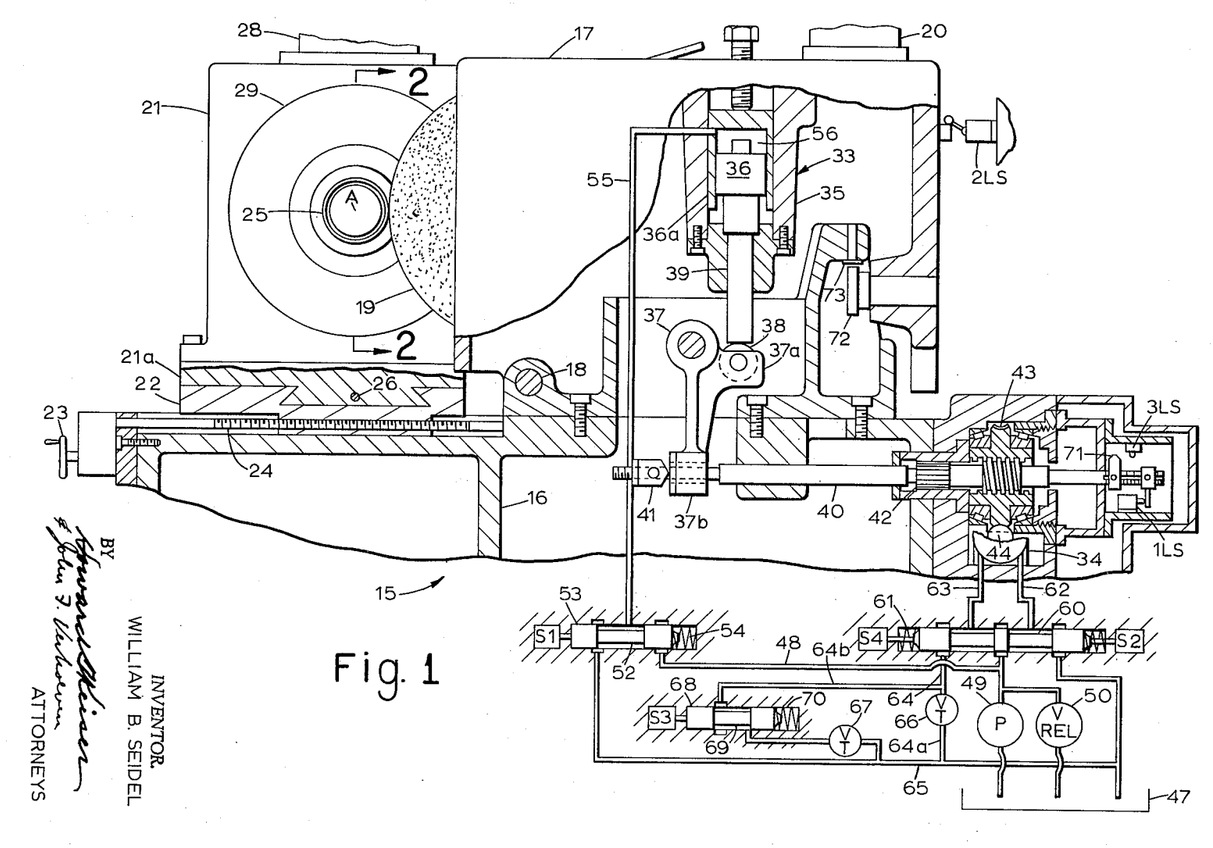
FIG. 1 is a view, partly in cross-section, of the wheelhead and headstock of a grinding machine for grinding the outer peripheral surface of an annular workpiece.

There is shown in FIG. 1 a grinding machine, indicated generally at 15, in which is shown, for illustrative purposes, one type of apparatus for effecting relative feed movement between a rotating grinding wheel and a workpiece. The grinding machine has a base 16 upon which wheelhead 17 is pivotally mounted for rocking about the axis of shaft 18 in the wheelhead. A grinding wheel 19 is mounted in the wheelhead for rotation by motor 20 mounted on the wheelhead. A headstock 21 is secured to a headstock slide 21a mounted on a slide 22. Slide 22 is laterally adjustable on the base, towards and away from the wheelhead for set up by a handwheel 23. The handwheel 23 is connected to screw 24 which is journaled in the base and threadedly engaged with the slide 22. The headstock slide 21a is shiftable longitudinally on slide 22 for positioning the workpiece 25 in the plane of the grinding wheel during set up by means of a handwheel (not shown) connected to a screw 26 which is journaled in slide 22 and threadedly engaged with the headstock slide 21a. The headstock has a spindle 27 (see FIG. 2) rotated about axis A by motor 28 mounted on the headstock. A magnetic chuck 29 is rotated by the spindle and has a face plate on which the workpiece 25 is carried during grinding.

Movement of the grinding wheel 19 towards and away from a workpiece (laterally to axis A and parallel to the face plate) is effected by rocking of the wheelhead 17 about the axis of shaft 18. Rapid movement of the grinding wheel up to a workpiece occurs through operation of rapid advance hydraulic motor 33 mounted in the wheelhead, and feed movement, both coarse and fine, occurs through operation of hydraulic feed motor 34 mounted in the base. Rapid advance motor 33 comprises a cylinder 35 secured in the wheelhead and a piston 36 slidably received in a sleeve 36a in the cylinder. A bell crank lever 37 is pivotally mounted in the base and carries a roller 38 on one arm 37a which engages a piston rod 39 connected to piston 36. Feed shaft 40 is slidably mounted in the base and extends through the other arm 37b of lever 37 with clearance. Feed shaft 40 has a block 41 secured thereon with a pointed surface against which lever arm 37b is urged by the weight of the wheelhead. Axial movement of feed shaft 40, effected through feed motor 34, rocks lever 37 and hence wheelhead 17. Feed shaft 40 is held against rotation by the portion 42 thereon splined in the base but is moved axially by rotation of a worm wheel 43 which is threadedly received on shaft 40. Worm wheel 43 is rotated by worm 44 driven by feed motor 34.

Figure 11:
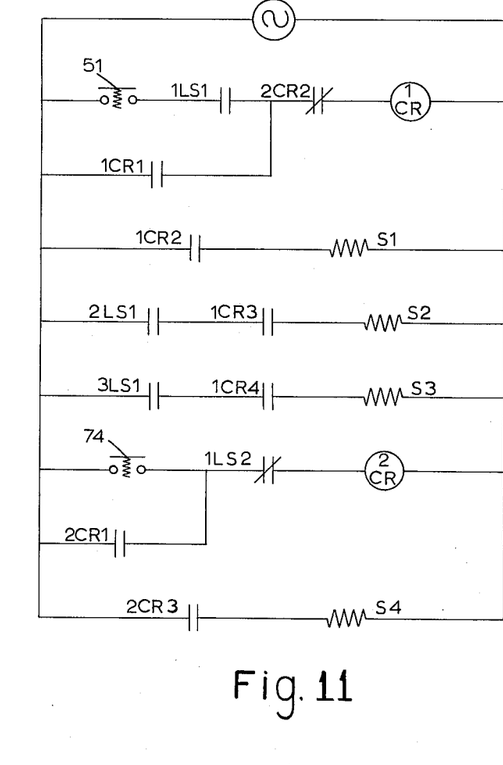
FIG. 11 is a schematic electrical diagram for the machine of FIG. 1.

A hydraulic system for the operation of rapid advance motor 33 and feed motor 34 is shown schematically in FIG. 1, the electrical circuit for the system being shown in FIG. 11. Fluid from sump 47 is supplied under pressure to pressure line 48 by pump 49. Relief valve 50, connected to line 48 and discharging to sump 47, establishes the maximum pressure in the pressure line. When switch 51 (FIG. 11) is momentarily closed, relay 1CR is energized through normally open contact 1LS1 (which is closed when the wheelhead is retracted) and normally closed contact 2CR2 of relay 2CR, closing normally open contacts 1CR1, 1CR2, 1CR3, and 1CR4 of relay 1CR. Closing of contact 1CR1 seals in relay 1CR and closing of contact 1CR2 energizes solenoid S1. When solenoid S1 is energized, movable valve plunger 52 of valve 53, which is normally held to the left by spring 54, is shifted to the right and pressure line 48 is connected to motor line 55 to transmit pressure to chamber 56 of the rapid advance motor 33. Since shaft 40 is held fixed when feed motor 34 is not operating, the wheelhead 17 is lifted and the grinding wheel advanced toward the workpiece 25 on the chuck. The cylinder 35 reaches its extreme limit to upward movement relative to piston 36, and hence terminates rapid advance of the grinding wheel, as the grinding wheel approaches the workpiece.

A limit switch 2LS, fixed relative to the base, is operated by the wheelhead at the end of rapid movement thereof to close normally open contact 2LS1 and energize solenoid S2 to shift spring centered valve member 60 of valve 61 to the left. With the valve member in this position, pressure line 48 is connected to motor line 62 of feed motor 34, and motor line 63 of that motor is connected through valve 61 to line 64. Line 64 has two branches, 64a and 64b, both connected to return line 65. Branch line 64a contains throttle valve 66, and branch line 64b contains throttle valve 67 connected in series with blocking valve 68. With valve member 60 to the left, and valve member 69 of blocking valve 68 held to the left by spring 70, discharge from motor 34 passes through both throttle valves. These connections run motor 34 to axially move feed shaft 40 to the right through worm 44 and worm wheel 43, producing a coarse feed of the grinding wheel into the work.

When, after a predetermined coarse feed, limit switch 3LS is operated by dog 71 to close contact 3LS1, solenoid S3 is energized to shift valve member 69 of valve 68 to the right and thereby block branch line 64b. Thus discharge from feed motor 34 can pass through throttle valve 66 only, and the feed motor is slowed to produce a fine feed rate of the grinding wheel into the workpiece. When the grinding wheel is at a predetermined final position, stud 72 in the wheelhead engages stop 73 in the base, to stop movement of the grinding wheel into the work. The wheelhead is left in its final position for a tarry period before retraction.

For retraction of the grinding wheel, switch 74 is momentarily closed to energize relay 2CR through the normally closed contact 1LS2, closing normally open contacts 2CR1 and 2CR3 of relay 2CR and opening normally closed contact 2CR2 of that relay. The opening of contact 2CR2 drops relay 1CR, releasing solenoids S1, S2, and S3. Closing of contact 2CR1 seals in relay 2CR, and closing of contact 2CR3 energizes solenoid S4. When solenoid S4 of valve 61 is energized and solenoid S2 of that valve released, valve member 60 is shifted to the right, connecting pressure line 48 to motor line 63 and connecting motor line 62 directly to return line 65 for a rapid return movement of shaft 40 to the left. When solenoid S1 is released, valve member 52 of valve 53 is shifted to the left to connect chamber 56 of rapid advance motor 33 to the sump. Thus full rapid retraction of the grinding wheel is effected. When feed shaft 40 is to the left, limit switch 1LS is operated to open contact 1LS2, dropping out relay 2CR. Contact 1LS1 is closed at the same time to condition the system for the next grind operation.

Figures 2, 3, 7:
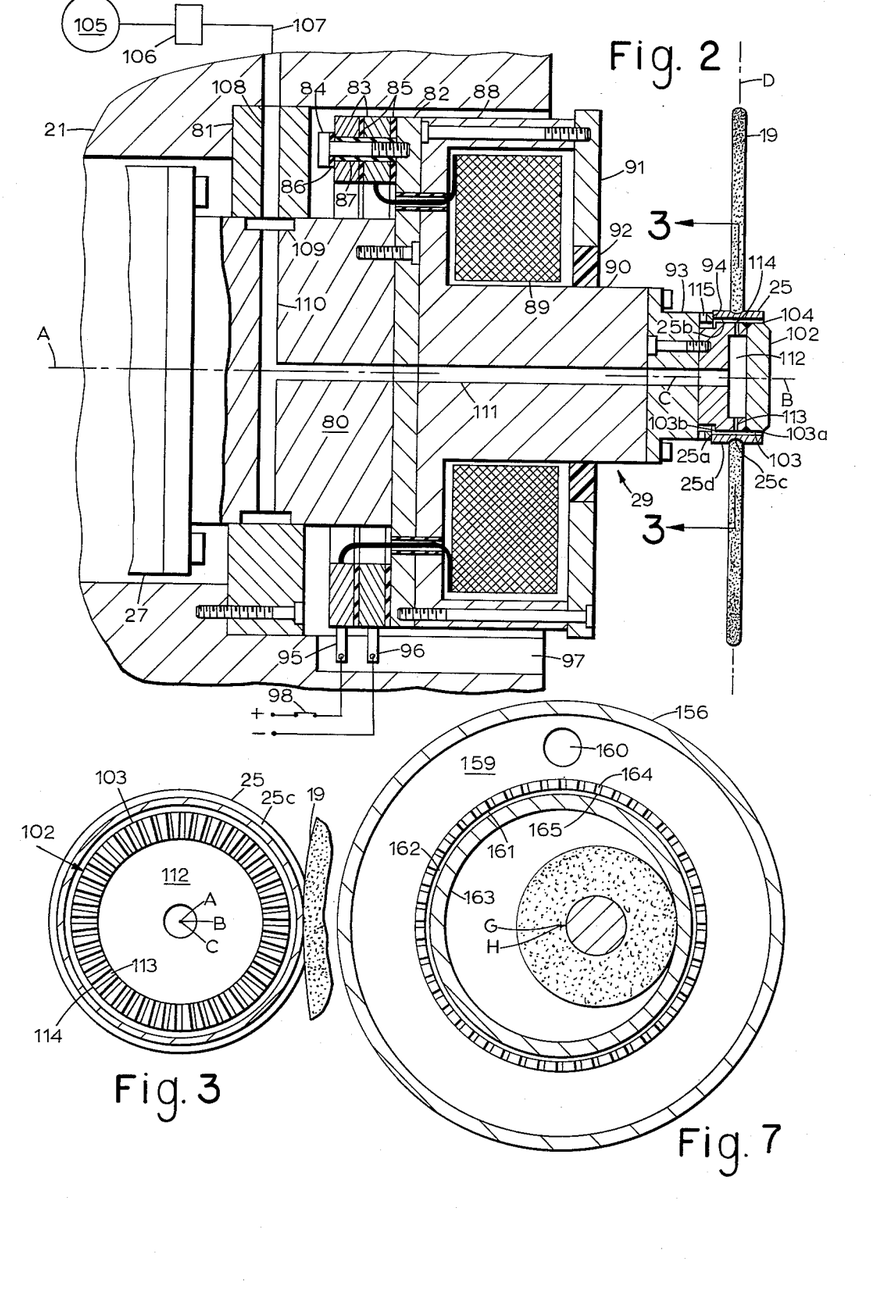
FIG. 2 is a view taken on the line 2—2 of FIG. 1.
FIG. 3 is a view taken on the line 3—3 of FIG. 2.
FIG. 7 is a view taken on the line 7—7 of FIG. 6.

As shown in FIG. 2, the spindle 27 has a nose piece 80 at the front end thereof which is rotatably received in a fluid distributor ring 81 secured in the headstock. The magnetic chuck 29 is carried by the spindle nose piece and has a plate 82 secured to the forward end of the nose piece which supports, on the back face thereof, two stacked commutator rings 83. The rings, which are secured to plate 82 by bolts 84 in spaced relation to the nose piece 80, are electrically insulated from each other and from the plate 82 by insulating gaskets 85, insulating washers 86, and insulating bushings 87. A cup shaped electromagnet member 88, containing coil 89, is secured to the front face of ring plate 82 and has a central pole piece 90 extending forwardly through the coil and through a front cover plate 91. Cover plate 91 has an annular ring 92 of plastic or other non-magnetic material surrounding pole 90 (to minimize diversion of flux from a path through the workpiece). A workpiece driver member 93 is connected to the forward end of pole piece 90 and terminates in a flat annular surface 94 defining the face plate. The workpiece 25 has a central longitudinal axis B and an end surface 25a normal to that axis. Two brushes 95 and 96 are mounted in slot 97 in the headstock to engage the rotating rings 83. When switch 98 is closed, the face plate 94, which is adapted to receive the end 25a of the workpiece thereagainst, is magnetized to magnetically hold the workpiece.

A cylindrical stud 102, having a central longitudinal axis C, is made of stainless steel (to minimize diversion of flux from a path through the workpiece) and is secured to the workpiece driver member for rotation therewith with axis C coaxial with the axis of rotation A of the spindle 27. The stud 102 constitutes a support member and has an outer, or external, peripheral support surface 103 which, in cross section, defines a circle having a center on the axis C of the support member and on the axis A of rotation of the spindle 27. When the annular workpiece 25 is centered with respect to the stud 102 (that is, when the central longitudinal axis B of the workpiece lies on the central longitudinal axis C of the stud) an annular gap 104 is defined between the support surface and the inner peripheral surface 25b of the workpiece of equal span around the support member and workpiece.

Air under pressure is supplied from a source 105, through pressure regulating valve 106, to line 107 which connects to passage 108 in fluid distributor ring 81. Passage 108 is in continuous communication with annular groove 109 of the rotatable nose piece 80, and radial passages 110 connect groove 109 with a central longitudinal passage 111 extending from nose piece 80, through ring plate 82, pole piece 90, workpiece driver 93, to a cavity 112 in support member 102. As shown best in FIG. 3, radial passages 113 from cavity 112, equally angularly spaced about the central longitudinal axis C of the stud, terminate in equally angular spaced orifices, or openings, 114 in support surface 103. Air discharging from openings 114 escapes forwardly through gap 104 to atmosphere and rearwardly through gap 104 and through angularly spaced discharge passages 115 to atmosphere. Each radial passage 113 defines a restriction to flow of fixed magnitude and gap 104 defines a restriction to flow of magnitude depending on the span of the gap so that, at any instant, a pressure develops between these restrictions depending on the span of the gap at the radial passage.

In the operation illustrated in FIGS. 1, 2, and 3, an annular groove 25c is ground in the external peripheral surface 25d of the workpiece. The grinding wheel 19 moves into the workpiece in plane D (normal to the axis A of rotation of spindle 27) and applies a lateral grinding force on the workpiece acting in that plane (that is, a force having an axial center of pressure in plane D). The surface 103, which, with the workpiece surface 25b, defines gap 104, extends forwardly from plane D to forward edge 103a and extends an equal distance rearwardly from plane D to rear edge 103b. The openings 114 in surface 103 lie in the plane D and are therefore midway between the front and rear of gap 104 so that, at any opening 114, the restriction to the flow of air forwardly through gap 104 is equal to the restriction to the flow of air rearwardly through gap 104.

Figures 4, 5:
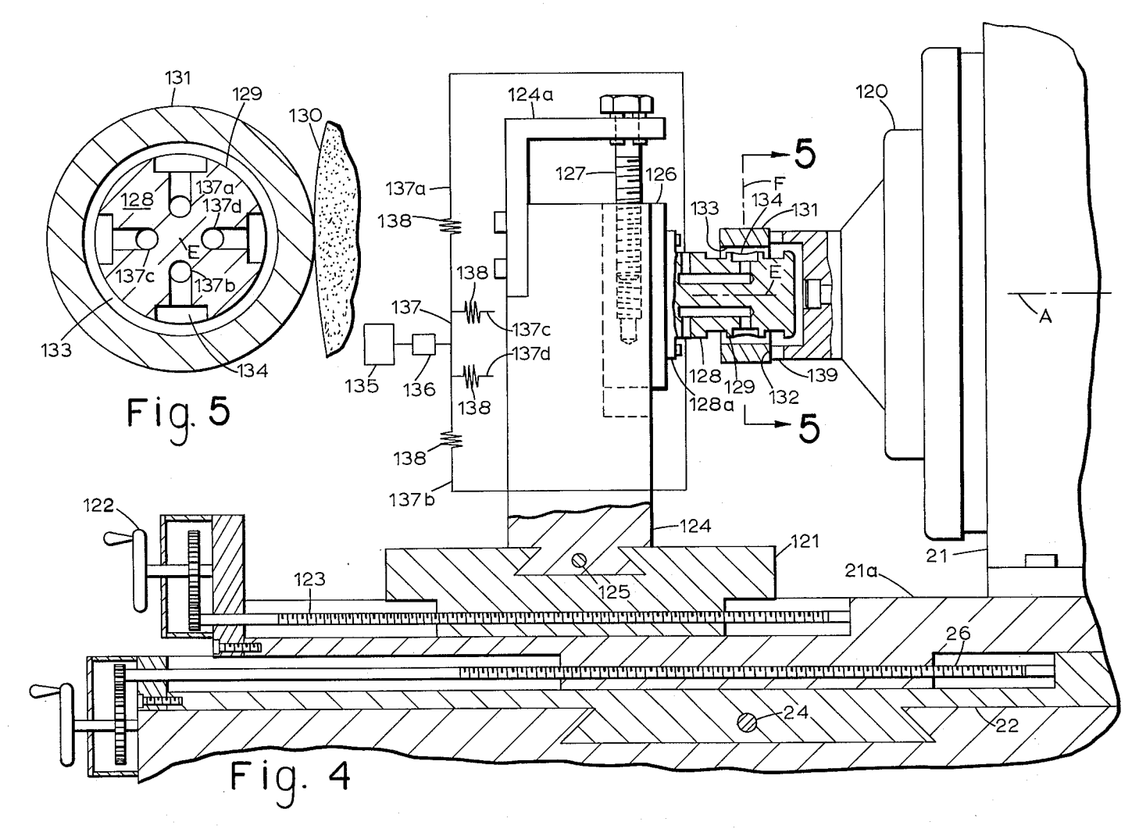
FIG. 4 is a view, partly in cross section, of a modified version of the machine of FIG. 1 for grinding the outer peripheral surface of an annular workpiece.
FIG. 5 is a view taken on the line 5—5 of FIG. 4.

Another embodiment of the invention is shown in FIGS. 4 and 5, and is illustrated in conjunction with machine 15, modified as hereinafter described. In this embodiment no support member is mounted on the chuck and a magnetic chuck 120, without air passages, such as the chuck shown in U.S. Patent 2,864,622, is connected to the front end of spindle 27. A slide 121, mounted on the headstock slide 21a, is movable towards and away from the headstock 21 by means of handwheel 122 connected to a screw 123 which is journaled in the headstock slide 21a and threadedly engaged with a dovetailed portion on slide 121. An upstanding standard 124 is mounted on slide 121 for lateral movement thereon (that is, movement towards and away from the grinding wheel) by means of a hand wheel (not shown) connected to screw 125 which is journaled in slide 121 and threadedly engaged with a dovetailed portion of standard 124. A slide 126 is mounted on the standard for vertical movement thereon by means of screw 127 journaled in a bracket 124a on the standard and threadedly engaged with a dovetailed portion of slide 126. A stud 128 has a flange 128a secured to slide 126. Stud 128, which defines a support member, is circular in cross-section and has a longitudinal central axis E which can be brought into coaxial relationship with axis A of the spindle 27 by means of lateral adjustment of standard 124 and vertical adjustment of slide 126. Support member 128 has an annular land 129 thereon defining a support surface, which, in cross-section, is circular with a center on axis E. The grinding wheel 130 acts on the entire external peripheral surface of the workpiece 131 and produces a resultant lateral grinding force acting in plane F (that is, a force having an axial center of pressure in plane F). The support member 128, after a workpiece is placed on face plate 132, can be moved inside the workpiece by means of longitudinal movement of slide 121 by handwheel 122 to position the land 129 in centered relationship to plane F. When the workpiece is centrally located with respect to the central axis F of the support member 128 and the support surface 129 thereof, an annular gap 133 is defined between the workpiece and the support surface 129 of equal span around the workpiece.

Support surface 129 has four openings, or pockets 134 therein, equally angularly spaced about axis E and axially located centrally in the land. Fluid, such as a liquid coolant, from a source 135 of liquid coolant under pressure, is supplied through a pressure regulating valve 136 to a line 137. Line 137 has four branches 137a, 137b, 137c, and 137d, each containing a choke coil 138. Each branch line 137a, 137b, 137c, 137d is connected through support member 128 to one of the pockets 134. Fluid discharging from the pockets flows toward the magnetic chuck and away from the magnetic chuck between the and and the workpiece. Fluid flowing toward the magnetic chuck is discharged through discharge passages 139 herein. Each choke coil defines a restriction of fixed magnitude and the gap 133 at each pocket defines a restriction of magnitude depending on the span of the gap at that pocket, so that a pressure is developed at each pocket depending on the span of the gap at the pocket. The pockets provide a higher gap pressure, for any given supply pressure, than the simpler restricted passages shown in the embodiment previously described. Preferably, the liquid used is a water based machine tool coolant which has a higher specific heat (and therefore better heat transfer characteristics) at any given pressure than air. However, the liquid coolant, as a practical matter of economy, must be reclaimed from the grinding operation (while the air is merely discharged to the atmosphere at the operation) and should be filtered before being returned to the source. It will be noted that the support member 128 is stationary and without rotation so that the axis thereof remains in a fixed position regardless of any run out, or eccentricity, of the headstock spindle.

Figure 6:
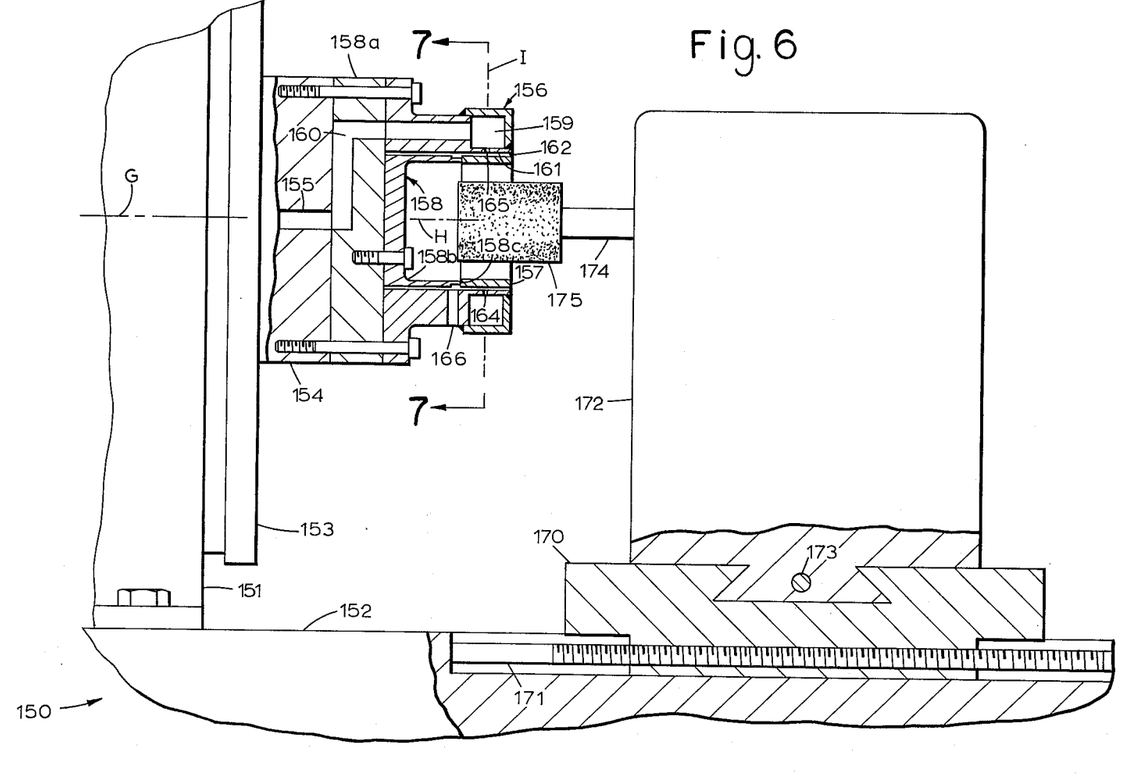
FIG. 6 is a view, partly in cross-section, of the wheelhead and headstock of a grinding machine for grinding the inner peripheral surface of an annular workpiece.

In the embodiments of the invention previously described, the fluid pressure acts on the inner surface of the annular workpiece for an external grind thereon. The fluid pressure, however, acts on the external surface of the workpiece when an internal grind is to be performed. This is done with either air or liquid, with either orifices or pockets, and is done with the support member connected to the workpiece driver for rotation therewith, or with the support member fixed adjacent the workpiece driver (as, for example, on the headstock). For illustrative purposes, there is shown in FIGS. 6 and 7 an embodiment in which the support member is connected to the workpiece driver, and in which air under pressure is passed through orifices to establish a pressure on the outer peripheral surface of the workpiece. An internal grinding machine 150 has a headstock 151 secured to base 152. Headstock 151 has a spindle (not shown) rotatable on axis G and has a magnetic chuck 153 connected to the forward end of the spindle. The structure not shown of the magnetic chuck 153 is identical to the chuck 29. The chuck 153 has a forwardly extending pole piece 154 with a central fluid passage 155, corresponding, respectively, to the pole piece 90 and fluid passage 111 of chuck 29, and air under pressure is supplied to fluid passage 155 in the same manner as supplied to passage 111. In this embodiment a rim 156, which defines a support member and is made of nonmagnetic material such as stainless steel, is secured to a workpiece driver 158 of magnetic material comprising a disc member 158a and a cup-shaped member 158b terminating in a face plate 158c. The workpiece driver 158 is connected to the spindle nose piece 154 and the rim 156 is connected to the workpiece driver over the member 158b thereof to extend around the outside of a workpiece 157 received against the face plate. The support member has an annular cavity 159 which is connected by passage 160, extending through the rim and disc, to the central air passage 155 of the chuck. The support member has an internal cylindrical support surface 161, defining, in cross section, a circle with a center on the central longitudinal axis H of the rim which is coaxial with the axis G of rotation of the spindle. Support surface 161 defines an annular gap 162 of constant span with the outer peripheral surface of the workpiece 157 when the workpiece is centered with respect to axis H. A plurality of restrictive passages 164 between the cavity 159 and the guide surface 161, which are radial with respect to axis H, have openings, or orifices, 165 in the support surface 161 (equally angularly spaced about axis H) for discharge of air through the gap. In this embodiment the length of the gap is determined by the length of the workpiece and the orifices lie in a plane I centered in the axial direction with respect to the workpiece. Air flowing forwardly from the orifices 165 through the restriction defined by the gap 162 is discharged to atmosphere and air flowing rearwardly from the orifices through the gap is discharged through radial discharge passages 166 to atmosphere. Although the support member 156 is described as a rim, it will be understood that it is only the inner peripheral surface of this support member which must define, in cross-section, a circle.

A conventional internal grinding machine feed system, or a feed system as shown in U.S. Patent 2,909,006, can be used to effect relative movement between a grinding wheel and the workpiece. For purposes of illustration there is shown a slide 170, mounted on base 152, which has a depending dove-tailed portion threadedly engaged with a screw 171 journaled in the base for longitudinal movement of slide 170 towards and away from the headstock by rotation of the screw. A wheelhead 172 is mounted on slide 170 and is laterally movable thereon by rotation of a screw 173 which is journaled in slide 170 and threadedly engaged with a dovetail portion of the wheelhead. The wheelhead has a spindle 174 with a grinding wheel 175 thereon which can be inserted into the workpiece by rotation of screw 171 and fed laterally into the workpiece by rotation of screw 173.

Figure 8A:
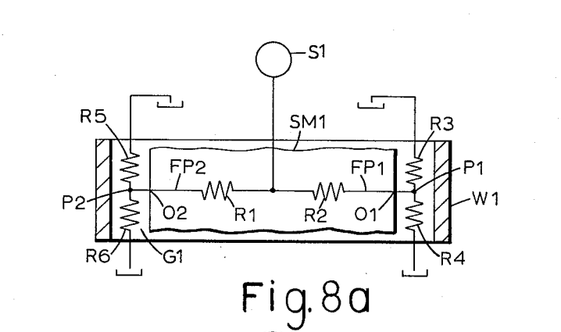
FIGS. 8a and 8b are schematic fluid circuit diagrams showing how fluid pressure is developed on the inner peripheral surface of a workpiece and on the outer peripheral surface of a workpiece, respectively.
Figure 8B:
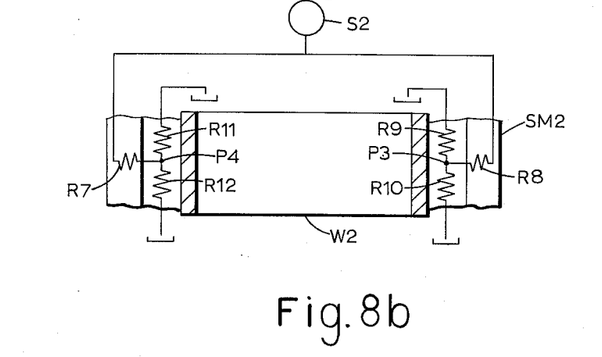

The action of the fluid on a workpiece is shown schematically in FIGS. 8a and 8b, FIG. 8a showing the embodiment in which a support member SM1 is in the form of a stud and FIG. 8b showing the embodiment in which a support member SM2 is in the form of a rim. Referring to FIG. 8a, each fluid passage in the stud terminating at an opening has a restriction therein between the source of fluid under pressure S1 and the opening. For illustrative purposes fluid passages FP1 and FP2 only are shown and these passages terminate at diametrically opposite openings O1, O2 in the stud surface. Each of these passages has a resistance R1, R2, respectively. In the embodiment utilizing pockets, the resistances R1, R2 are defined by the choke coils 138; in the embodiment using orifices the resistances R1, R2 are defined by the restrictive passages 113 leading to the orifices. In either case, the gap G1 between the workpiece W1 and the stud extends forwardly and rearwardly from the openings and defines, on one side of the workpiece, equal resistances R3, R4, and on the other side of the workpiece, equal resistances R5, R6. The fluid, as it flows from the source of pressure to discharge, develops a pressure at P1, P2. The resistances R1, R2 are fixed and equal, so the pressure P1 will depend on the value of resistances R3, R4 and the pressure P2 will depend on the value of resistances R5, R6. The larger the gap at a particular opening, the lower the resistances defined by that gap will be, and the lower the pressure in that gap at that opening. Conversely, the smaller the gap, the larger the resistances defined by that gap will be, and the higher the pressure in that gap at the opening. When the workpiece is centered with respect to the stud, the span of the gap will be constant around the stud and workpiece, the resistances defined by the gap will be everywhere equal, and the pressure at all the openings, including pressures P1, P2, will be equal. When the workpiece is displaced from a centered position with respect to the stud, as, for example, to the left as viewed in FIG. 8a, the gap at the left side of the workpiece increases while the gap at the right side of the workpiece decreases. Resistances R5, R6 decrease, causing pressure P2 to decrease, and resistances R3, R4 increase, causing pressure P1 to increase. The difference in pressures P1, P2, which act in opposite senses on the workpiece, results in a pressure differential urging the workpiece to the right and back to a centered position with respect to the stud. Conversely, displacement of the workpiece to the right would produce a pressure differential urging the workpiece to the left and back to a centered position with respect to the stud.

The action of the fluid on a workpiece when a rim is used is similar to the fluid action when a stud is used except that with a rim, fluid pressure acts on the outer peripheral surface of the workpiece instead of on the inner peripheral surface thereof as when a stud is used. In FIG. 8b, where fluid from a source S2 passes through the rim SM2 to operate on the outer peripheral surface of a workpiece W2, the resistances R7, R8 (defined by restrictive passages 164) correspond to the resistances R1, R2 of FIG. 8a, the resistances R9, R10, R11, R12 correspond to the resistances R3, R4, R5, R6 of FIG. 8a, and the pressures P3, P4 correspond to the pressures P1, P2 of FIG. 8a.

Figure 13:
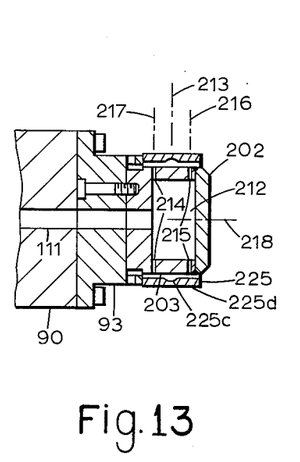
FIG. 13 is a view in cross-section showing a modified form of support stud.

In the embodiments previously described, the openings (pockets or orifices) in the support member (stud or rim) lie in a single plane normal to the central longitudinal axis of the support. Preferably this single plane is axially positioned centrally between the front and rear of the gap, so that the resistance offered to the rearward flow of fluid from each opening is equal to the forward flow of fluid from the opening. With the gap flow paths equal, maximum pressure is realized in the gap for any given source pressure. It is also preferable, moreover, when the openings lie in a single plane, that this plane be axially aligned with the center of pressure of the grinding force applied to the workpiece so that cocking of the workpiece is avoided. When the workpiece is long, or when the geometry of the workpiece prevents the use of openings in a single plane aligned with the resultant grinding force, two sets of openings are used. As shown in FIG. 13, a workpiece 225, the outer peripheral surface 225d of which is to be ground, has an annular groove 225c on the inner peripheral surface. Fluid pressure forces cannot be applied to the inner peripheral surface of the workpiece at the groove because the groove would prevent the development of a pressure differential on displacement of the workpiece. Support stud 202 is connected to the workpiece driver 93 and has a central cavity 212 in communication with the fluid passage 111. The center of pressure of the grinding wheel acts in the plane 213 of the groove 225c. Two sets of radial restrictive passages 214, 215 from cavity 212 terminate in openings in the outer support surface 203. These sets of openings lie, respectively, in spaced planes 216, 217 normal to the central longitudinal axis 218 of the stud. The planes 216 and 217 straddle the plane 213 and are equally spaced therefrom. Each set of openings is equally angularly spaced about the axis 218.

Figure 14:
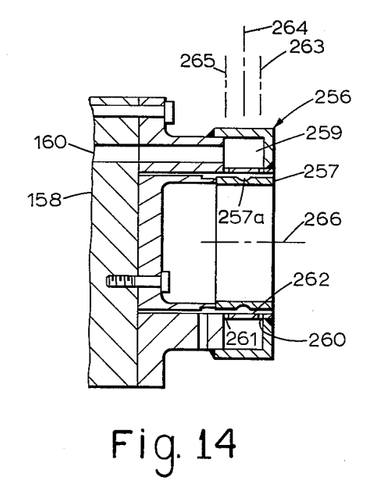
FIG. 14 is a view in cross-section showing a modified form of support rim.

When the inner peripheral surface of a workpiece 257 is to be ground, and the outer peripheral surface has a central annular groove 257a, a rim member, such as 256 shown in FIG. 14, is used. The rim member, connected to workpiece driver 158, has an annular cavity 259 in communication with fluid passage 160. Two sets of radial passages 260, 261 from cavity 259 terminate in two sets of openings in the support surface 262 of the rim. The set of openings 260 lies in plane 263 on one side of the plane 264 of groove 257a, and the set of openings 261 lies in the plane 265 on the other side of plane 264. The planes 263 and 265 are equally spaced from plane 264 and are normal to the central longitudinal axis 266 of the rim member. The openings in each plane 263, 265 are equally angularly spaced about the axis 266.

Figure 9A:
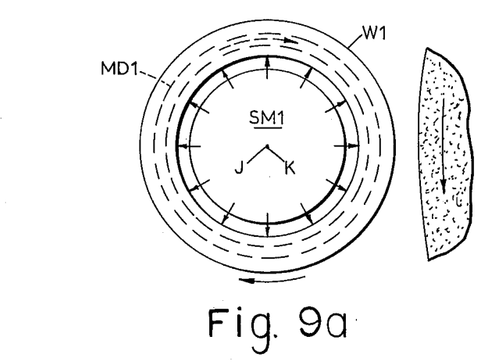
FIGS. 9a, 9b, 9c are schematic views of an operation on the external peripheral surface of a workpiece before the grind begins, during the grind, and at the end of the grind, respectively.
Figure 12:
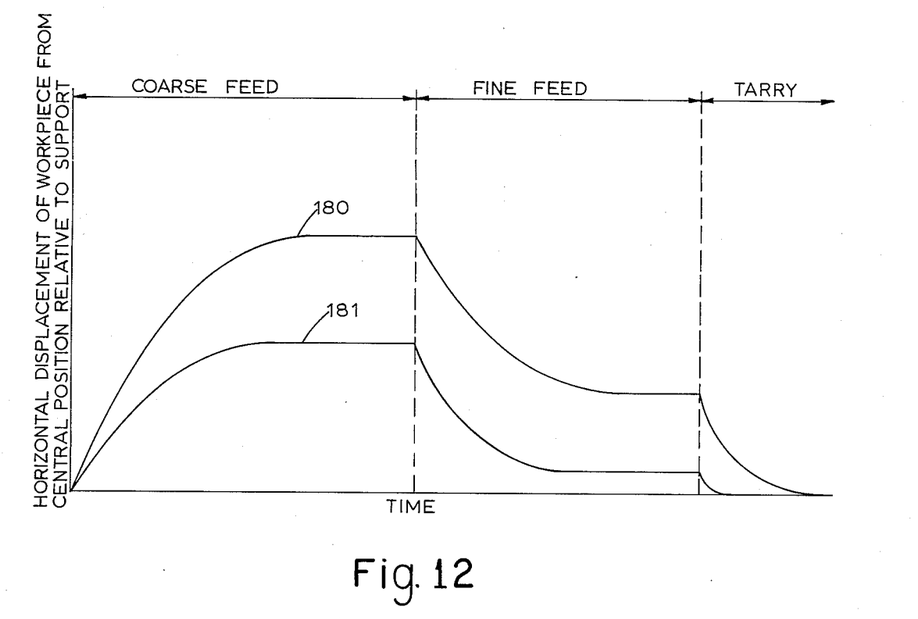
FIG. 12 is a graph showing the horizontal displacement of the workpiece by the grinding force during a grind.

The operation of the present invention can best be understood by reference to the schematic drawings FIGS. 9a, 9b, 9c, 10a, 10b, 10c, and the graph of FIG. 12. When the support member constitutes a stud such as SM1 the annular workpiece W1, which has an inner diameter larger than the outer diameter of the stud, is placed over the stud and against the magnetic driver face plate MD1, if the stud is connected to the workpiece driver. If, on the other hand, the stud is separately mounted, the stud is retracted as the workpiece is placed against the magnetic face plate and the stud is then moved into the workpiece. The magnetic force of the face plate urges the end of the workpiece thereagainst with sufficient force to hold the workpiece on the face plate and to rotate the workpiece as the face plate rotates. However, the resistance to lateral displacement of the workpiece (which depends on the magnitude of the magnetic force and the friction between the face plate and the end of the workpiece) is small and is readily overcome by the lateral forces on the workpiece resulting from a fluid pressure differential or a grinding force. Thus, the fluid under pressure slides the workpiece on the face plate to center the workpiece with respect to the stud before the grinding force is applied to the workpiece, as shown in FIG. 9a. At this time the central longitudinal axis of the stud J is coaxial with the central longitudinal axis K of the workpiece. The workpiece, which is shown rotated in a clockwise direction by the magnetic driver, has a slower surface speed than the grinding wheel which is shown rotated in a counterclockwise direction.

Figure 9B:
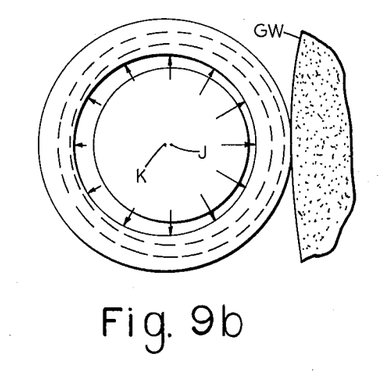

When the workpiece is centered on the stud, the fluid forces around the workpiece, which act on the workpiece radially with respect to the axis J of the stud, are balanced as indicated by the radial arrows. Consequently, when the grinding wheel GW, moving at a given feed rate, first encounters the workpiece, the workpiece, since it is not clamped in the machine, slides on the face plate and is bodily displaced in the direction of movement of the grinding wheel, which is to the left as shown in FIG. 9b. To the extent the workpiece is bodily displaced by the grinding force, distortion of the workpiece is avoided. This displacement produces a differential fluid pressure force (as indicated by the radial arrows), increasing as the displacement of the workpiece from a center position on the stud increases. This differential fluid pressure force resists displacement of the workpiece, and urges the workpiece to the right toward a centered position on the stud and against the grinding wheel. It will be noted that the forces acting on the side of workpiece contacted by the grinding wheel increase to oppose the force of the grinding wheel through the wall of the workpiece, while the forces on the opposite side of the workpiece decrease, to minimize distortion of the workpiece. When this differential fluid force urging the workpiece to the right equals the force exerted by the moving grinding wheel urging the workpiece to the left, the workpiece will be held in an equilibrium position displaced from a centered position relative to the stud.

The graph of FIG. 12 shows the horizontal displacement of a workpiece during a feed cycle, curve 180 representing the horizontal displacement of the workpiece when a lower fluid pressure is delivered to the support member from a source and curve 181 representing the horizontal displacement when a higher fluid pressure is delivered to the support member from the source. When the workpiece is held in an equilibrium position (indicated by the horizontal portions of the curves) as, for example, during the coarse feed portion of the grind cycle, the wall thickness of the workpiece is decreasing at a rate equal to the coarse feed rate. The grinding rate determines the equilibrium position of the workpiece and preferably, the grinding rate during the coarse feed portion of the cycle is maintained at a rate low enough so that the workpiece reaches the equilibrium position before making metal-to-metal contact with the support member.

Figure 9C:
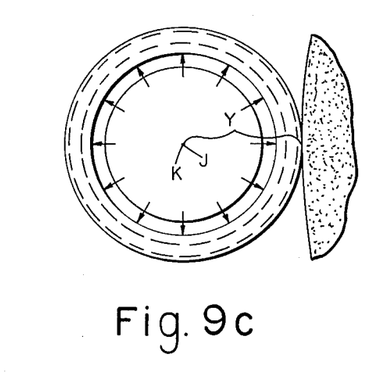

When the grinding wheel is slowed down or stopped, the grinding force diminishes and the fluid pressure moves the workpiece toward a centered position on the stud. If the grinding wheel is slowed to a fine feed rate, the workpiece is shifted toward centered relationship with the stud to a new equilibrium position. In this new equilibrium position, the wall thickness of the workpiece diminishes at a rate equal to the fine feed rate. When the grinding wheel is stopped, the differential fluid pressure returns the workpiece to a centered position on the stud, as shown in FIG. 9c, and locates the workpiece relative to the final position of the grinding wheel. The movement of the grinding wheel is stopped when the grinding surface of the wheel is at a distance Y from the central axis of the support member equal to the final desired radius of the surface being ground.

Figure 10A:
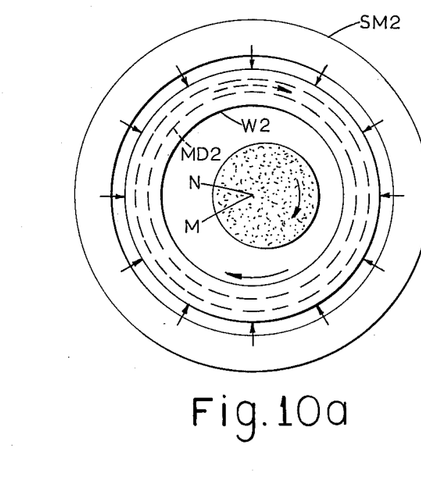
FIGS. 10a, 10b, 10c are schematic views of an operation on the internal peripheral surface of a workpiece before the grind begins, during the grind, and at the end of the grind, respectively.
Figure 10B:
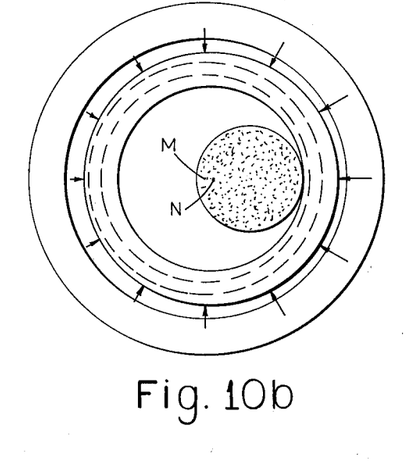
Figure 10C:
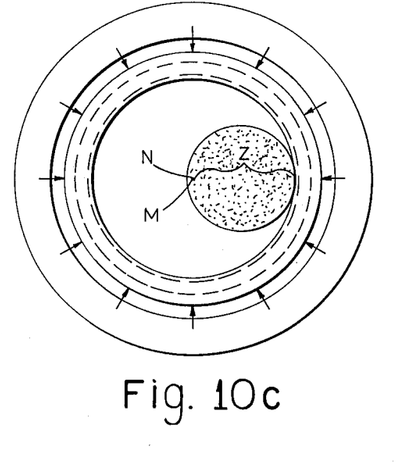

When the support member constitutes a rim such as SM2, the annular workpiece W2, which has an outer diameter smaller than the inner diameter of the rim, is placed inside the rim and against the magnetic driver face plate MD2. The fluid pressure tends to center the workpiece when it is first placed against the face plate, as shown in FIG. 10a, before grinding, to align the central longitudinal axis N of the workpiece with the central longitudinal axis M of the rim. During grinding, the grinding wheel, moving to the right, exerts a lateral grinding force on the workpiece bodily displacing the workpiece to the right and creating a pressure differential force. This pressure differential force, which increases as displacement of the workpiece increases, resists displacement of the workpiece, as shown by the radial arrows in FIG. 10b, and when the grinding force decreases, returns the workpiece to centered relationship with the rim, as shown in FIG. 10c. The final position of the surface of the grinding wheel at point of contact with the workpiece is spaced a distance Z from the center of the rim equal to the desired final radius of the surface being ground.

To simplify FIGS. 9a, 9b, 9c, 10a, 10b, 10c, no vertical displacement of the workpiece has been shown. Although gravity, the grinding wheel, and the face plate when the workpiece is off-center thereon, exert vertical forces on the workpiece, the net vertical force is continuously resisted by a net vertical fluid pressure force acting in the opposite sense.

It will be appreciated that whenever the workpiece is displaced from the axis of rotation of the face plate, the face plate will tend to orbit the workpiece about the axis of rotation unless the workpiece is otherwise restrained. It would not be expected that the grinding wheel, alone, could stabilize the workpiece. Under an unstable condition of the workpiece, the application of the fluid under pressure to the workpiece would be expected to dampen or reduce any erratic behavior of the workpiece, but it would be uncertain whether the fluid under pressure would completely control the workpiece to the extent of locating the workpiece in a stable final position for a precision grind.

Surprisingly, it has been found that when a workpiece supported solely by a magnetic face plate is displaced from a central position on the axis of rotation of the face plate a limited amount by feed movement of a grinding wheel, the workpiece tends to center itself with relation to the axis of rotation of the face plate after the feed movement of the grinding wheel is stopped, with material being removed from the workpiece until the workpiece is centered. With the coaction of the rotating face plate and the grinding wheel tending to center the workpiece, the effect of the fluid pressure on the workpiece is not one of combating an unstable condition, but one of aiding and accelerating the tendency of the system to center the workpiece with respect to the axis of rotation of the face plate.

In actual tests conducted with apparatus similar to the apparatus of FIGS. 1, 2, and 3, an annular workpiece ¼ inch long, having an inner diameter of 2$\frac{5}{16}$ inches and an outer diameter of 2½ inches, was ground. The stud had 48 equally angularly spaced orifices to which air was supplied through radial passages of .028 inch diameter. With the workpiece centered relative to the stud, a gap with a span of about .0005 inch was defined around the inner peripheral surface of the workpiece. With no air under pressure supplied to the stud, the workpiece, during feeding movement of the grinding wheel, was initially shifted against the stud and finally became centered relative thereto approximately 20 seconds after the grinding wheel was stopped. With air under a pressure of 90 pounds per square inch supplied to the stud, and with the same grind cycle, the maximum displacement of the workpiece (during coarse grind) was almost .0003 inch, and the workpiece became centered relative to the stud approximately 2 seconds after the grinding wheel stopped.

What is claimed is:

1. In a machine tool having a rotatable face plate adapted to receive thereagainst one end of an annular workpiece for rotation of the workpiece during grinding, said machine tool having a rotatable grinding wheel to grind one of the peripheral surfaces of the annular workpiece, a workpiece support having a surface defining in cross section a circle with a center on a predetermined axis and having a plurality of passages extending therethrough for connection during grinding to a source of fluid under pressure, said passages terminating respectively in angularly spaced openings in said support surface and each of said passages restricted between the source and the opening to define a resistance to fluid flow upstream from each of said openings respectively, said surface of the support in registration with the other peripheral surface of the workpiece and in closely spaced relation thereto to define an annular gap therewith of equal span around the workpiece when the workpiece is centered with respect to said predetermined axis, said gap defining a resistance to flow downstream from each opening varying as the span of the gap varies at each opening in response to displacement of the workpiece from said centered position.

2. The mechanism of claim 1 in which said workpiece support is fixed during grinding.

3. The mechanism of claim 1 in which said workpiece support is connected for rotation with the face plate.

4. In a machine tool having a face plate rotatable about an axis and adapted to receive thereagainst one end of an annular workpiece for rotation of the workpiece during grinding, said machine tool having a rotatable grinding wheel to grind one of the peripheral surfaces of the annular workpiece, said grinding wheel generating a grinding force bodily displacing the workpiece on the face plate, a workpiece support having a surface defining in cross-section a circle with a center on a predetermined axis and having a plurality of passages extending therethrough for connection during grinding to a source of fluid under pressure, said passages terminating respectively in equally angularly spaced openings in said support surface and restricted between the source and each opening to define equal fixed resistances to fluid flow upstream from said openings, said surface of the support in registration with the other peripheral surface of the workpiece and in closely spaced relation thereto to define an annular gap therewith of equal span around the workpiece when the workpiece is centered with respect to said predetermined axis, said gap defining equal resistances to flow downstream from each opening when the workpiece is in said centered position to produce equal pressure forces at the openings, said downstream resistances varying as the span of the gap varies at each opening in response to displacement of the workpiece from said centered position to generate a pressure differential on the workpiece urging the workpiece toward said centered position.

5. The mechanism of claim 4 in which the centers of said openings lie in a single plane normal to said axis.

6. The mechanism of claim 4 in which the support surface has two sets of openings lying, respectively, in spaced planes normal to said predetermined axis, the openings of each set being equally angularly spaced about said predetermined axis.

7. In a machine tool for grinding one of the peripheral surfaces of an annular workpiece,
 (a) a rotatable face plate adapted to receive one end of a workpiece thereagainst,
 (b) means to urge a workpiece against the face plate for rotation by the face plate,
 (c) a rotatable grinding wheel,
 (d) means to effect relative feeding movement between the grinding wheel and a workpiece on the face plate for grinding of said one peripheral surface, said feeding movement producing a grinding force bodily displacing the workpiece on the face plate,
 (e) a support member having a support surface in registration with the other peripheral surface of a workpiece on the face plate, said support surface defining in cross-section a circle with a center on a predetermined axis normal to said face plate, said support surface having openings therein and defining a gap with the workpiece surface equally resistive to fluid flow from the openings when the workpiece is centered with respect to said axis and of varying resistance to fluid flow from the openings as the workpiece is displaced from a centered position with respect to said axis,
 (f) means defining a plurality of restricted passages terminating respectively at said openings,
 (g) and means to supply fluid under pressure to said passages during grinding to produce fluid pressure forces at said openings resisting bodily displacement of the workpiece on the face plate by the grinding force and urging a workpiece on the face plate toward a centered position with respect to said axis.

8. The mechanism of claim 7 in which said openings are defined by pockets in the support surface.

9. The mechanism of claim 7 in which said fluid is liquid.

10. The mechanism of claim 7 in which said fluid is air.

11. In a machine tool having means to rotate an annular workpiece in a plane and having a rotating grinding wheel to engage the outer peripheral surface of the annular workpiece and exert a grinding force on the workpiece displacing the workpiece within said plane, apparatus for controlling the workpiece within said plane during grinding comprising a stud received inside the annular workpiece during grinding, said stud having an external surface of circular cross-section with a diameter smaller than the inner diameter of the workpiece to permit bodily shifting of the workpiece within said plane upon application of the grinding force to the workpiece, said external surface of the stud having a plurality of openings therein, a source of fluid under pressure, and a restricted passage between said source and each opening to produce a pressure force at each opening determined by the span of the gap between the workpiece and said external surface at the opening.

12. The mechanism of claim 11 in which said fluid is liquid.

13. The mechanism of claim 11 in which said fluid is air.

14. In a machine tool having a face plate rotatable about an axis to engage one end of an annular workpiece for rotation of the workpiece in a plane during grinding, said machine tool having a rotating grinding wheel to engage the outer peripheral surface of the annular workpiece and exert a grinding force on the workpiece displacing the workpiece within said plane, apparatus for controlling the workpiece within said plane during grinding comprising a stud received inside the annular workpiece and fixed therein on said axis during grinding, said stud having an outer cylindrical surface with a diameter smaller than the inner diameter of the workpiece to permit bodily shifting of the workpiece within said plane upon application of the grinding force to the workpiece, said outer surface of the stud having a plurality of equally angularly spaced openings therein, a source of fluid under pressure, and a restricted passage between said source and each opening to produce a pressure force at each opening determined by the span of the gap between the workpiece and said external surface at the opening.

15. The mechanism of claim 14 in which the centers of said openings lie in a single plane normal to said axis aligned with the center of pressure of the grinding force.

16. The mechanism of claim 14 in which the outer surface of the stud has two sets of openings lying, respectively, in spaced planes normal to said axis, the openings of each set being equally angularly spaced about said axis.

17. In a machine tool for grinding the outer periphery of an annular workpiece,
 (a) a rotatable face plate,
 (b) means to urge one end of the workpiece against the face plate for rotation by the face plate and for sliding movement on the face plate,
 (c) a rotatable grinding wheel,
 (d) means to effect relative feeding movement between the grinding wheel and a workpiece on the face plate to effect abrading contact with the outer peripheral surface of the workpiece and impart a grinding force to the workpiece displacing the workpiece on the face plate,
 (e) a stud extending inside a workpiece on the face plate during grinding, said stud having an external surface of circular cross-section with a diameter smaller than the inner diameter of the workpiece to permit bodily shifting of the workpiece on the face plate upon application of the grinding force to the workpiece, said external surface of the stud having openings therein and defining a gap with the workpiece surface equally resistive to fluid flow from the openings when the workpiece is centered with respect to the stud and of different resistance to fluid flow from the openings when the workpiece is displaced from a centered position with respect to said stud,
 (f) means defining a plurality of restricted passages terminating respectively at said openings,
 (g) and means to supply fluid under pressure to said passages during grinding to produce fluid pressure forces at said openings resisting bodily displacement of the workpiece on the face plate by the grinding force and urging a workpiece on the face plate toward a centered position with respect to said axis.

18. The mechanism of claim 17 in which said openings are defined by pockets in the external surface of the stud.

19. In a machine tool for grinding the outer peripheral surface of an annular workpiece having a central axis and having an end surface normal to said central axis, the combination comprising,
(a) a magnetic face plate rotatable about an axis and adapted to receive said end surface of the workpiece for rotation of the workpiece by the face plate and for sliding movement of the workpiece on the face plate,
(b) a rotatable grinding wheel,
(c) means to effect relative feeding movement between the grinding wheel and a workpiece on the face plate to effect abrading contact with the outer peripheral surface of the workpiece and to impart a grinding force to the workpiece displacing the workpiece on the face plate,
(d) a support stud extending inside a workpiece on the face plate during grinding, said stud having an outer surface defining in cross-section a circle having a center on the axis of rotation of the face plate and having a diameter smaller than the inner diameter of the workpiece to permit bodily shifting of the workpiece on the face plate upon application of the grinding force to the workpiece, said outer surface of the stud having a plurality of equally angularly spaced openings therein and defining a gap with the workpiece surface providing an equal resistance to flow from the openings when the workpiece is centered with respect to said stud and providing different resistances to flow from different openings when the workpiece is displaced from centered relation to the stud,
(e) a plurality of passages defining equal fixed resistances to flow extending through said stud and terminating at said openings respectively,
(f) and means to supply fluid under pressure to said passages during grinding to produce equal pressure forces at said openings when the workpiece is centered with respect to said stud and to produce unequal pressure forces when the workpiece is displaced from centered relation with respect to said stud.

20. The mechanism of claim 19 in which said support stud is fixed during grinding.

21. The mechanism of claim 19 having a rotating chuck to which the face plate and the support stud is connected for rotation.

22. In a machine tool having means to rotate an annular workpiece in a plane and having a rotating grinding wheel to engage the inner peripheral surface of the annular workpiece and exert a grinding force on the workpiece displacing the workpiece within said plane, apparatus for controlling the workpiece within said plane during grinding comprising a rim received outside the annular workpiece during grinding, said rim having an internal surface of circular cross section with a diameter larger than the outer diameter of the workpiece to permit bodily shifting of the workpiece within said plane upon application of the grinding force to the workpiece, said internal surface of the rim having a plurality of openings therein, a source of fluid under pressure, and a restricted passage between said source and each opening to produce a pressure force at each opening determined by the span of the gap between the workpiece and said internal surface at the opening.

23. The mechanism of claim 22 in which said fluid is liquid.

24. The mechanism of claim 22 in which said fluid is air.

25. In a machine tool having a face plate rotatable about an axis to engage one end of an annular workpiece for rotation of the workpiece in a plane during grinding, said machine tool having a rotating grinding wheel to engage the inner peripheral surface of the annular workpiece and exert a grinding force on the workpiece displacing the workpiece within said plane, apparatus for controlling the workpiece within said plane during grinding comprising a rim received outside the annular workpiece and fixed centrally with respect to said axis during grinding, said rim having an internal cylindrical surface with a diameter larger than the outer diameter of the workpiece to permit bodily shifting of the workpiece within said plane upon application of the grinding force to the workpiece, said internal surface of the rim having a plurality of equally angularly spaced openings therein, a source of fluid under pressure, and a restricted passage between said source and each opening to produce a pressure force at each opening determined by the span of the gap between the workpiece and said internal surface at the opening.

26. The mechanism of claim 25 in which the centers of said openings lie in a single plane normal to said axis aligned with the center of pressure of the grinding force.

27. The mechanism of claim 25 in which the internal surface of the rim has two sets of openings lying, respectively, in spaced planes normal to said axis, the openings of each set being equally angularly spaced about said axis.

28. In a machine tool for grinding the inner surface of an annular workpiece,
(a) a rotatable face plate,
(b) means to urge one end of the workpiece against the face plate for rotation by the face plate and for sliding movement on the face plate,
(c) a rotatable grinding wheel,
(d) means to effect relative feeding movement between the grinding wheel and a workpiece on the face plate to effect abrading contact with the inner surface of the workpiece and imparting a grinding force to the workpiece displacing the workpiece on the face plate,
(e) a rim extending around the outside of a workpiece on the face plate during grinding, said rim having an internal surface of circular cross-section with a diameter larger than the outer diameter of the workpiece to permit bodily shifting of the workpiece on the face plate upon application of the grinding force to the workpiece, said internal surface of the rim having openings therein and defining a gap with the workpiece surface equally resistive to fluid flow from the openings when the workpiece is centered with respect to the rim and of different resistance to fluid flow from the openings when the workpiece is displaced from a center position with respect to said rim,
(f) means defining a plurality of restricted passages terminating respectively at said openings,
(g) and means to supply fluid under pressure to said passages during grinding to produce fluid pressure forces at said openings resisting bodily displacement of the workpiece on the face plate by the grinding force and urging a workpiece on the face plate toward a center position with respect to said axis.

29. The mechanism of claim 28 in which said openings are defined by pockets in the internal surface of the rim.

30. In a machine tool for grinding the inner peripheral surface of an annular workpiece having a central axis and having an end surface normal to said central axis, the combination comprising,
(a) a magnetic face plate rotatable about an axis and adapted to receive said end surface of the workpiece for rotation of the workpiece by the face plate and for sliding movement of the workpiece on the face plate,
(b) a rotatable grinding wheel,
(c) means to effect relative feeding movement between the grinding wheel and a workpiece on the face plate to effect abrading contact with the outer peripheral surface of the workpiece on the face plate,
(d) a support rim extending around the outside of a workpiece on the face plate during grinding, said rim having an inner surface defining in cross section a circle having a center on the axis of rotation of the face plate and having a diameter larger than the outer diameter of the workpiece to permit bodily shifting of the workpiece on the face plate upon application of the grinding force to the workpiece, said inner surface of the rim having a plurality of equally angularly spaced openings therein and defining a gap with the workpiece surface providing an equal resistance to flow from the openings when the workpiece is centered with respect to said rim and providing different resistances to flow from different openings when the workpiece is displaced from centered relation to the rim, (e) a plurality of passages defining equal fixed resistances to flow extending through said rim and terminating at said openings respectively, (f) and means to supply fluid under pressure to said passage during grinding to produce equal pressure forces at said openings when the workpiece is centered with respect to said rim and to produce unequal pressure forces when the workpiece is displaced from centered relation with respect to said rim.

31. The mechanism of claim 30 in which said support rim is fixed during grinding.

32. The mechanism of claim 30 having a rotating chuck to which the face plate and the support rim are connected for rotation.

33. The method of supporting an annular workpiece for a peripheral grind thereon comprising the steps of,
(a) locating the workpiece axially in a predetermined plane normal to the axis of the workpiece,
(b) rotating the workpiece in said plane,
(c) applying balanced fluid pressure forces around the workpiece to locate the workpiece in a predetermined position in said plane,
(d) grinding a peripheral surface of the workpiece, and
(e) unbalancing the fluid pressure forces on the workpiece during grinding to create a pressure differential on the workpiece opposing the grinding force applied to the workpiece.

34. The method of grinding one of the peripheral surfaces of an annular workpiece comprising the steps of,
(a) locating the workpiece axially in a predetermined plane normal to the axis of the workpiece,
(b) rotating the workpiece in said planes,
(c) applying equally spaced equal fluid pressure forces around the other peripheral surface of the workpiece to locate the workpiece in a predetermined position in said plane,
(d) effecting a grind on one peripheral workpiece surface, and
(e) modifying the fluid pressure forces on the workpiece as the workpiece is displaced from said predetermined position by the grind to create a pressure differential on the workpiece urging the workpiece back toward said predetermined position.

35. The mehod of grinding one peripheral surface of an annular workpiece to a predetermined radius comprising the steps of,
(a) locating the workpiece axially in a predetermined plane normal to the axis of the workpiece, (b) rotating the workpiece in said plane,
(c) applying balanced fluid pressure forces around the other peripheral surface of the workpiece acting radially with respect to an axis to locate the workpiece in a predetermined position in said plane centered with respect to said axis,
(d) effecting feeding movement between a grinding member and the workpiece to effect a grind on said one peripheral workpiece surface,
(e) unbalancing the fluid pressure forces on the workpiece as the workpiece is displaced from said predetermined position by the grind to create a pressure differential on the workpiece urging the workpiece back toward said predetermined position,
(f) stopping the feeding movement when the surface of the grinding member is spaced from said axis a distance equal to said predetermined radius, and
(g) rebalancing the fluid pressure forces on the workpiece as the workpiece returns to said predetermined position.

36. The method of grinding the outer peripheral surface of an annular workpiece comprising the steps of,
(a) locating the workpiece axially in a predetermined plane normal to the axis of the workpiece,
(b) rotating the workpiece in said plane,
(c) applying equal fluid pressure forces around the inner peripheral workpiece surface when the workpiece is in a predetermined position in said plane,
(d) effecting a grind on the outer peripheral workpiece surface, and
(e) simultaneously increasing the fluid pressure force nearest the grinding point and decreasing the fluid pressure force farthest from the grinding point during the grind to oppose the grinding force on the workpiece.

37. The method of grinding the inner peripheral surface of an annular workpiece comprising the steps of,
(a) locating the workpiece axially in a predetermined plane normal to the axis of the workpiece,
(b) rotating the workpiece in said plane,
(c) applying equal fluid pressure forces around the outer peripheral workpiece surface when the workpiece is in a predetermined position in said plane,
(d) effecting a grind on the inner peripheral workpiece surface, and
(e) simultaneously increasing the fluid pressure force nearest the grinding point and decreasing the fluid pressure force farthest from the grinding point during the grind to oppose the grinding force on the workpiece.

References Cited by the Examiner

UNITED STATES PATENTS

| | | | |
|---|---|---|---|
| 2,023,720 | 12/35 | Asbridge | 51—103 |
| 2,034,507 | 3/36 | Colson | 51—103 X |
| 2,314,533 | 3/43 | Wallace | 51—289 |
| 2,354,296 | 7/44 | Arms | 51—237 |
| 2,799,977 | 7/57 | Jones et al. | |

FOREIGN PATENTS 1,266,921  6/61  France.

LESTER M. SWINGLE, *Primary Examiner.*